United States Patent [19]

Ikegame

[11] Patent Number: 5,267,229
[45] Date of Patent: Nov. 30, 1993

[54] OPTICAL ELEMENT DRIVE APPARATUS

[75] Inventor: Tetsuo Ikegame, Hachioji, Japan

[73] Assignee: Olympus Optical Co., Ltd., Tokyo, Japan

[21] Appl. No.: 771,432

[22] Filed: Oct. 4, 1991

[30] Foreign Application Priority Data

Oct. 12, 1990 [JP] Japan .................................. 2-272372
Nov. 20, 1990 [JP] Japan .................................. 2-314771

[51] Int. Cl.$^5$ ............................................ G11B 17/30
[52] U.S. Cl. .................................... 369/215; 360/106
[58] Field of Search ............ 367/215, 244, 221, 44.22; 360/105, 106, 108, 109

[56] References Cited

U.S. PATENT DOCUMENTS 5,043,972  8/1991  Kurihara et al. ..................... 369/215
5,138,605  8/1992  Shtipelman et al. ................. 369/215

FOREIGN PATENT DOCUMENTS

59-135638  8/1984  Japan .
62-178151  8/1987  Japan .
62-175422  11/1987  Japan .
63-279436  11/1988  Japan .

Primary Examiner—David C. Nelms
Assistant Examiner—K. Shami
Attorney, Agent, or Firm—Frishauf, Holtz, Goodman & Woodward

[57] ABSTRACT

An optical element drive apparatus includes an objective lens for applying a light beam spot to a recording surface of an optical disc and a holder for holding the objective lens. The objective lens is supported to be movable in the focusing direction and the tracking direction by a carriage through the holder. The objective lens is moved by first drive mechanism including focusing and tracking coils and a magnetic circuit magnetically acting on the coils. The magnetic circuit is partly constituted by the carriage. The carriage is supported by a support mechanism and moved in the tracking direction by second drive mechanism.

10 Claims, 12 Drawing Sheets

OPTICAL ELEMENT DRIVE APPARATUS

BACKGROUND OF THE INVENTION

1. Field of the Invention

The present invention relates to an optical element apparatus used in an optical information recording and retrieving apparatus for optically recording on and retrieving information from an information recording medium.

2. Description of the Related Art

Figure 1:
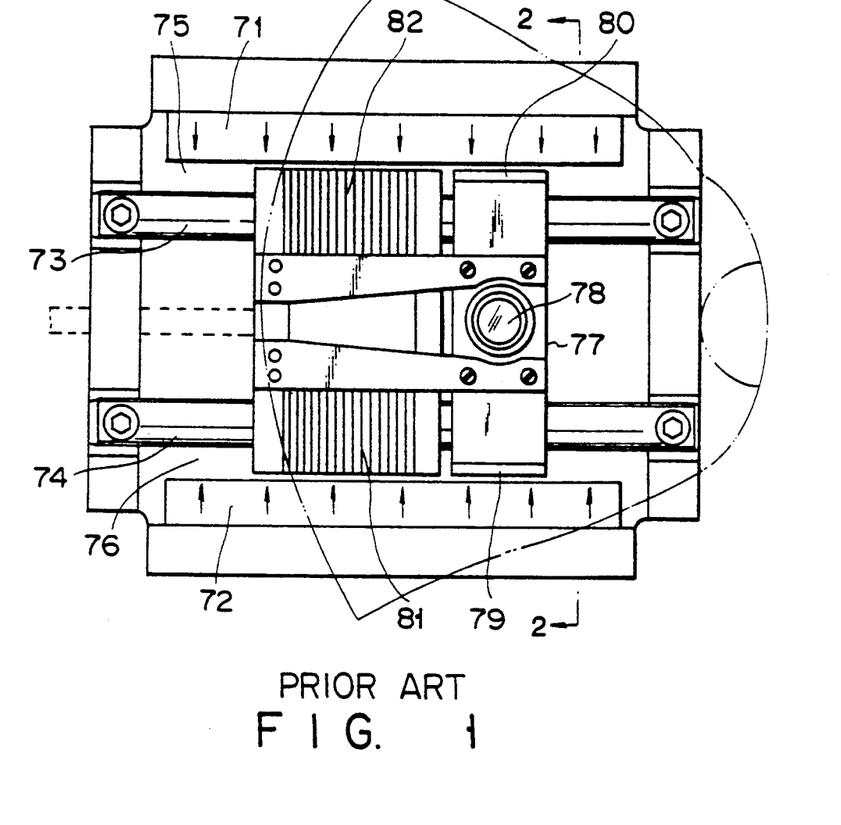
FIG. 1 is a top view showing a prior art optical element drive apparatus.
Figure 2:
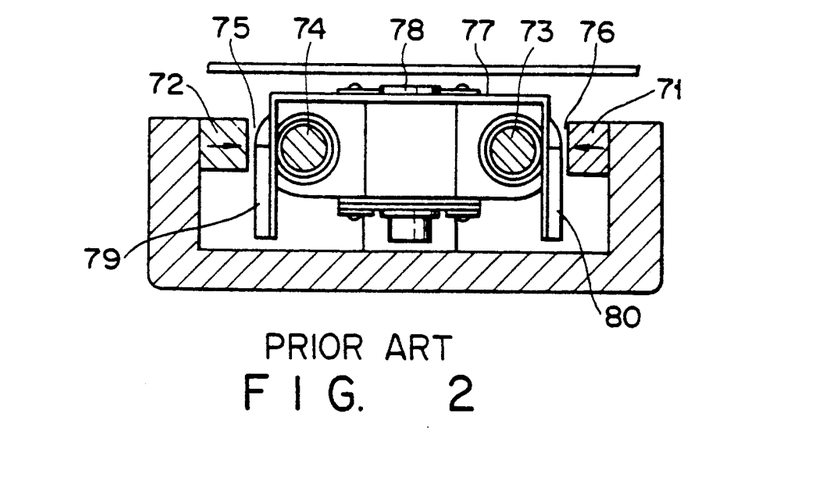
FIG. 2 is a sectional view taken along line 2—2 of FIG. 1.

Coarse and fine actuators are required in recording on or retrieving information from an optical information recording medium, such as an optical disk. The coarse actuator is used to coarsely drive an optical element in a tracking direction for an access to a track. The fine actuator is used to finely drive the optical element in a focusing direction and the tracking direction, in order to apply a beam spot properly. Conventionally, these coarse and fine actuators must be provided with their respective magnetic circuits. Disclosed in Published Unexamined Japanese Patent Application No. 59-135638, however, is a newly developed optical element drive apparatus. According to this apparatus, the magnetic circuits are used in common to the actuators, so that the size and weight of the apparatus are reduced. Referring now to FIGS. 1 and 2, this drive apparatus will be described in brief.

The optical element drive apparatus comprises a pair of permanent magnets 71 and 72, which extend parallel to each other so as to form translational paths, and a pair of supporting iron rods 73 and 74. A magnetic gap 75 is defined between the magnet 71 and the rod 73, and a magnetic gap 76 between the magnet 72 and the rod 74.

A holder 77 is supported on the supporting rods 73 and 74. A penetrating opening portion is formed on each side of the holder 77. The holder 77 is movably supported on the rods 73 and 74 in a manner such that the rods are loosely inserted in their corresponding opening portions.

An optical element 78 is held in the center of the front portion of the holder 77. A pair of focusing coils 79 and 80 are fixed individually to the opposite sides of the front portion of the holder 77 so that they are situated in the magnetic gaps 75 and 76, respectively. In this arrangement, the focusing coils 79 and 8 is isolated from the optical element 78.

Also, a pair of tracking coils 81 and 82 are fixed individually to the opposite sides of the rear portion of the holder 77 so that they are partially situated in the magnetic gaps 75 and 76, respectively. These tracking coils 81 and 82 are wound around the supporting rods 73 and 74, respectively, with a fine play.

Thus, the focusing coils 79 and 80 for driving the optical element 78 and the tracking coils 81 and 82 for driving the holder 77 are located in the common magnetic gaps 75 and 76.

In the conventional optical element drive apparatus constructed in this manner, the magnetic gaps are formed substantially at the opposite ends of the translational paths, so that the focusing coils are located wide apart from the optical element. Accordingly, the holding member of the optical element is bulky, so that the weight of the apparatus increases, the operating sensitivity is lowered, and the whole pickup is large-sized. Since the opening portions penetrated by the supporting rods are formed in the holding member, moreover, the rigidity and resonance frequency of the holding member are low. Further, the common magnetic gaps are used to drive the optical element and the holding member, so that the coils cannot enjoy their optimum magnetic gaps. Since the magnets are required corresponding to the stroke in the tracking direction, furthermore, the cost of production is high.

SUMMARY OF THE INVENTION

The object of the present invention is to provide an optical element drive apparatus, in which an optical element holding member and the whole structure of a pickup are reduced in size and weight, so that the operating sensitivity and resonance frequency are high, coils can enjoy optimum magnetic gaps, and the cost of production is low.

According to the present invention, there is provided an optical element drive apparatus, which comprises: an optical element for applying a light beam spot to a recording surface of an information recording medium; a holder for holding the optical element; first drive means including first coil means and a first magnetic circuit, for driving the optical element in a focusing direction and/or a tracking direction through the medium of the holder by causing the first magnetic circuit magnetically to act on the first coil means; a carriage for supporting the optical element through the medium of the holder so that the optical element is movable in the focusing direction and/or the tracking direction, the carriage constituting at least part of the first magnetic circuit; supporting means for supporting the carriage for movement in the tracking direction; and second drive means including second coil means and a second magnetic circuit, for driving the carriage in the tracking direction by causing the second magnetic circuit magnetically to act on the second coil means.

In this optical element drive apparatus, the optical element is driven in the focusing direction and/or the tracking direction through the medium of the holder by causing the first magnetic circuit magnetically to act on the first coil means.

Also, the carriage is driven in the tracking direction by causing the second magnetic circuit magnetically to act on the second coil means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a cutaway side view illustrating the members shown in FIG. 7;

DETAILED DESCRIPTION OF THE PREFERRED EMBODIMENTS

An optical element drive apparatus according to a first embodiment of the present invention will now be described in detail with reference to the accompanying drawings of FIGS. 3 to 6. In these drawings, arrows X and Z indicate a tracking direction and a focusing direction, respectively.

Figure 3:
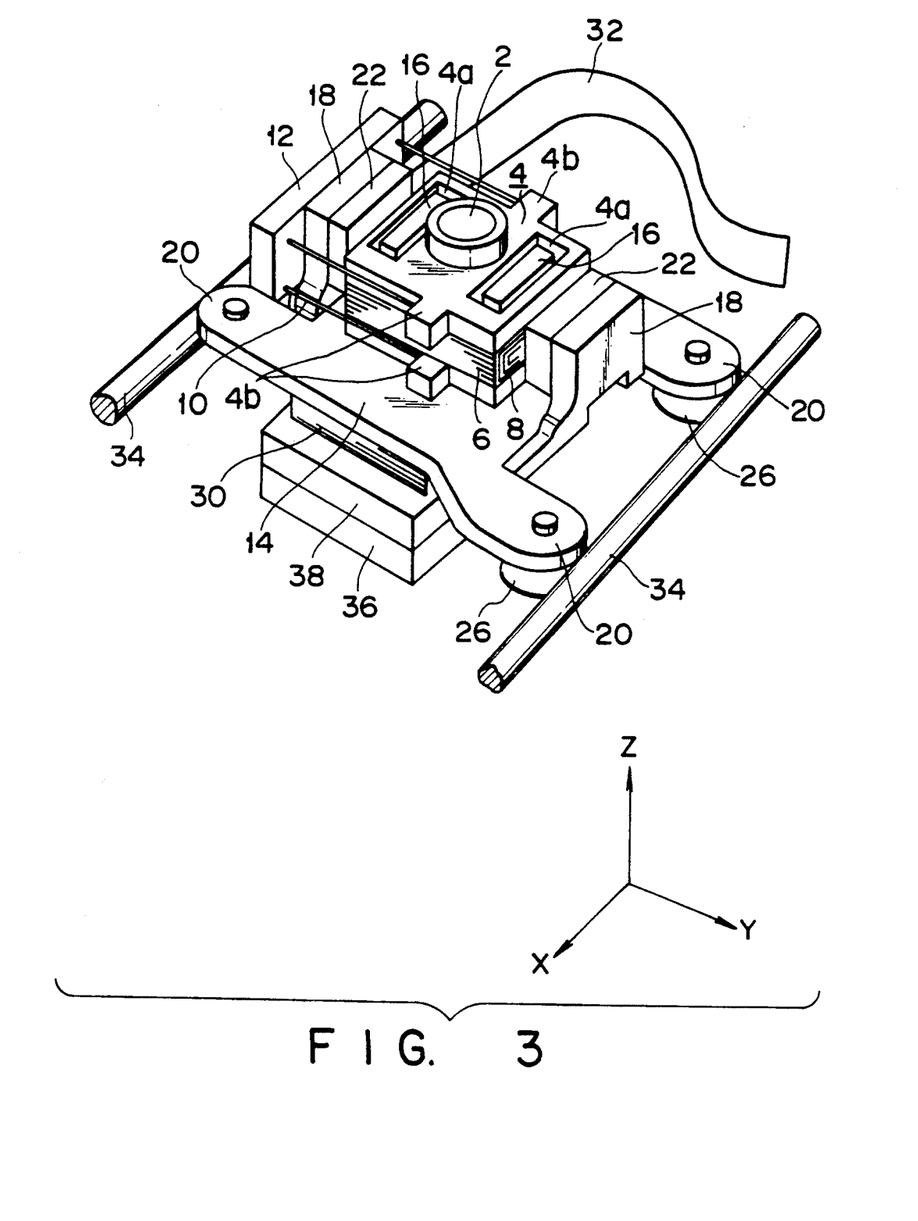
FIG. 3 is a perspective view showing an optical element drive apparatus according to a first embodiment of the present invention.

In FIG. 3, numeral 2 denotes an objective lens for use as an optical element for applying a light beam to an information recording medium (not shown). The lens 2 is fixed to the center of the upper portion of a substantially box-shaped lens holder 4. The holder 4 has a bottom opening through which the light beam is passed from below.

Two holes 4a vertically penetrate the lens holder 4, on either side of the objective lens 2. A pair of projections 4b, upper and lower, protrude substantially from the center of the front portion of the holder 4. Also, another pair of projections 4b protrude from the rear portion of the holder 4 in like manner. Thus, the four projections are formed on the lens holder 4.

Between the upper and lower projections 4b, a focusing coil 6 is wound on the lens holder 4 around a vertical axis. A pair of tracking coils 8 are fixed to the focusing coil 6 on each side of the holder 4. Each of the tracking coils 8 is wound substantially in the shape of a square around a horizontal axis. These coils 6 and 8 constitute first coil means.

Figure 4:
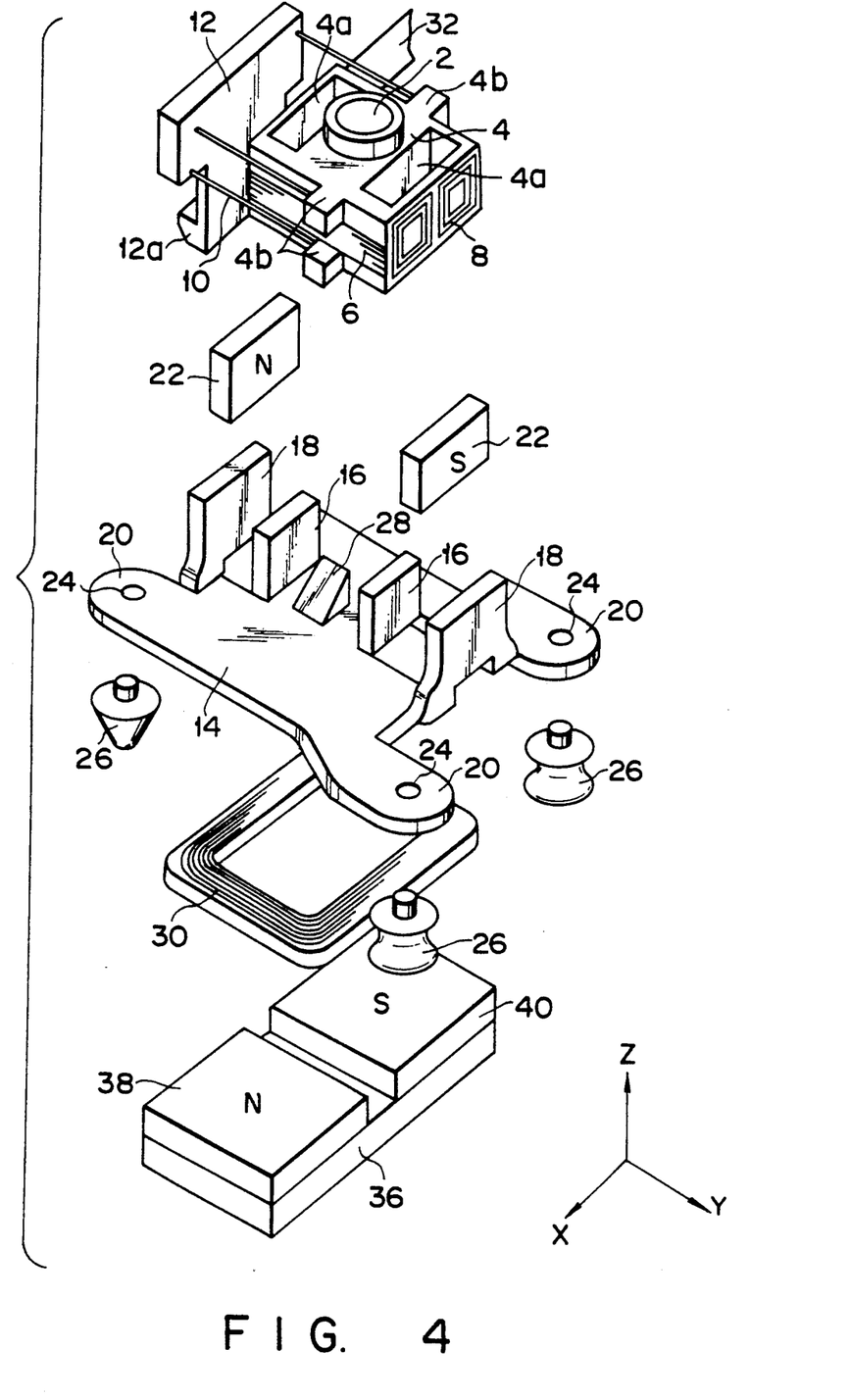
FIG. 4 is an exploded perspective view of the apparatus shown in FIG. 3.
Figure 5:
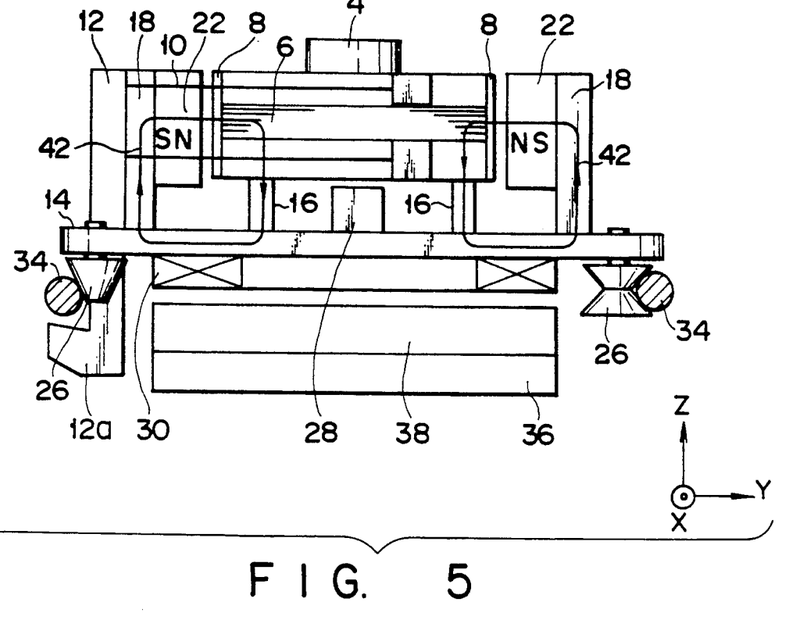
FIG. 5 is a front view of the apparatus shown in FIG. 3.

Each of the four projections 4b of the lens holder 4 is fixedly fitted with one end portion of a wire 10 which can bend in the tracking and focusing directions. The four wires 10 extend substantially parallel to one another. Each wire 10 is composed of a metal wire of beryllium copper or the like with a diameter of about 0.1 mm and a tube covering the same. The other end portion of each wire 10 is fixed to the each side portion of a rectangular retaining plate 12. As shown in FIGS. 4 and 5, a hook 12a extends downward from the lower part of the plate 12. It has an engaging portion projecting to the left from its distal end.

The objective lens 2, lens holder 4, focusing coil 6, tracking coils 8, and retaining plate 12 are arranged on a carriage 14. The carriage 14, which is formed of an iron plate with a thickness of about 1.2 mm, is partially bent upward by means of a press. The bent portions constitute a pair of inner yokes 16 and a pair of outer yokes 18 spaced wider from each other than the inner yokes 16. Those portions of the carriage 14 which horizontally project without bending constitute three legs 20. A pair of first magnets 22 are fixed individually to the opposed faces of the outer yokes 18. These magnets 22 are arranged so that their respective north poles face each other. Magnetic gaps are defined between the first magnets 22 and the inner yokes 16. A through hole 24 vertically penetrates each of the three legs 20, and a stem of a bearing 26 is fixed to each hole 24. The lens holder 4 is set on the carriage 14 in a manner such that the inner yokes 16 are loosely fitted in the holes 4a of the holder 4, and that the focusing coil 6 and the tracking coils 8 are arranged in the magnetic gaps defined between the first magnets 22 and the yokes 16. Thus, the objective lens 2 is supported to be movable in the focusing and tracking directions.

Between the paired inner yokes 16, a mirror 28 is fixed on the carriage 14. It has a specular surface inclined at about 45°. As shown in FIG. 5, the mirror 28 is located right under the objective lens 2 so as to upwardly reflect light from the front, that is, to reflect a light beam from a stationary optical system (not shown) toward the lens 2. The beam transmitted through the objective lens 2 is applied to the information recording medium (not shown), and the reflected light beam from the recording medium is transmitted again through the lens 2 and reflected toward a photosensor (not shown) by the mirror 28.

A carriage coil 30, which is wound in the shape of a rectangle around the vertical axis, is fixed to the lower surface of the carriage 14. This coil 30 constitutes second coil means. The carriage coil 30, the tracking coils 8, and the focusing coil 6 are connected electrically to an FPC 32 shown in FIG. 4, and are externally supplied with electric power through the FPC 32. One end portion of the FPC 32 is fixed to the retaining plate 12, while the other end portion is connected to a power source (not shown).

The carriage 14 is set on two rails 34 each in the form of a round rod extending in the tracking direction. The carriage 14 can move along the rails 34 in a manner such that the bearings 26, attached individually to the legs 20 of the carriage 14, engage the rails 34. The hook 12a of the retaining plate 12 is in engagement with the left-hand rail 34, as shown in FIG. 5, thus serving as a stopper which prevents the bearings 2 from being disengaged from the rails 34 when an excessive impact is applied to the carriage 14. Each end portion of each rail 34 is fixed by means of suitable fixing means (not shown).

A fixed yoke 36, formed of a rectangular magnetic body, is disposed under the carriage 14. The yoke 36, like the rails 34, is fixed by means of suitable fixing means (not shown). As shown in FIG. 4, two second magnets 38 and 40 are fixed on the upper surface of the fixed yoke 36. These second magnets 38 and 40 are arranged along the tracking direction, and are fixed so that the respective upper surfaces of the front and rear magnets 38 and 40 constitute north and south poles, respectively. The magnets 38 and 40 magnetically attract the carriage 14 to them. In this manner, the bearings 26 are pressed against the rails 34, so that play of the carriage 14 on the rails 34 can be prevented.

Magnetic fluxes produced by the first magnets 22 pass over the focusing coil 6 and the tracking coils 8, and are guided in the manner indicated by arrows 42 in FIG. 5 by the outer and inner yokes 18 and 16 and the bottom wall of the carriage 14 so that they magnetically interact with the coils 6 and 8. Thus, the outer and inner yokes 18 and 16 and the bottom wall of the carriage 14 partially constitute a first magnetic circuit 42 which magnetically interacts with the focusing coil 6 and the tracking coils 8.

Figure 6:
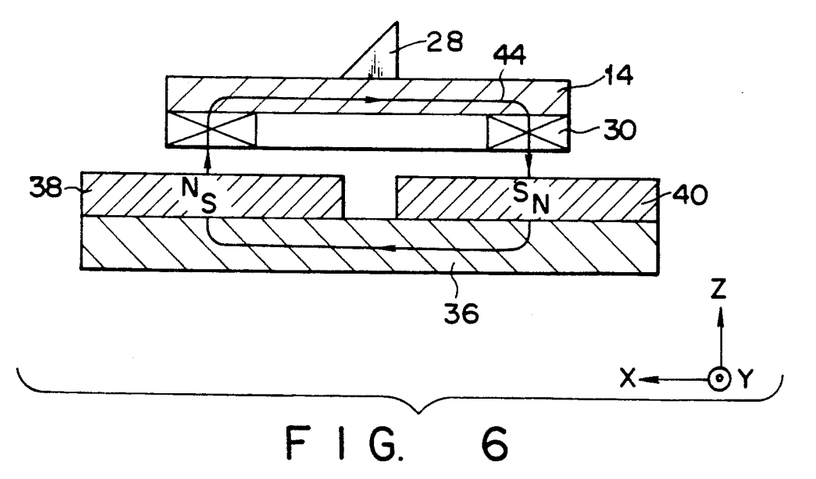
FIG. 6 is a cutaway side view of the apparatus shown in FIG. 3.

Further, a magnetic flux produced by the second magnets 38 and 40 passes over the carriage coil 30, and is guided in the manner indicated by arrow 44 in FIG. 6 by the fixed yoke 36 and the bottom wall of the carriage 14 so that it magnetically interacts with the coil 30. Thus, the fixed yoke 36 and the bottom wall of the carriage 14 partially constitute a second magnetic circuit 44 which magnetically interacts with the carriage coil 30.

If an electric current is supplied to the focusing coil 6 of the optical element drive apparatus constructed in this manner, it interacts with the first magnetic circuit 42 to drive the lens holder 4 up and down, so that the objective lens 2 move in the focusing direction (vertical direction).

If a current is supplied to the tracking coils 8, moreover, it interacts with the first magnetic circuit 42 to drive the lens holder 4 back and forth, so that the objective lens 2 finely moves in the tracking direction (back-and-forth direction).

If a current is supplied to the carriage coil 30, furthermore, it interacts with the second magnetic circuit 44 to coarsely drive the carriage 14 back and forth, so that the objective lens 2 moves in the tracking direction.

According to this arrangement of the optical element drive apparatus, the carriage itself partially constitutes each of the magnetic circuits for driving the objective lens in the focusing and tracking directions and for driving the carriage in the tracking direction. Therefore, the apparatus requires use of only a small number of components. Since the carriage is formed by means of the press, moreover, the mounting holes for the bearings can be formed at the same time, so that the manufacturing cost can be reduced. Further, the carriage coil and the carriage drive magnets (second magnets 38 and 40) are arranged on the lower surface of the carriage and under the carriage, respectively, so that the profile of the apparatus can be lowered. Since the carriage drive magnets magnetically attract the carriage to them, furthermore, the bearings of the carriage can be pressed against the rails without play. Thus, there is no need of springs or any other means for pre-loading the carriage against the rails, so that the construction of the apparatus is simple.

Figure 7:
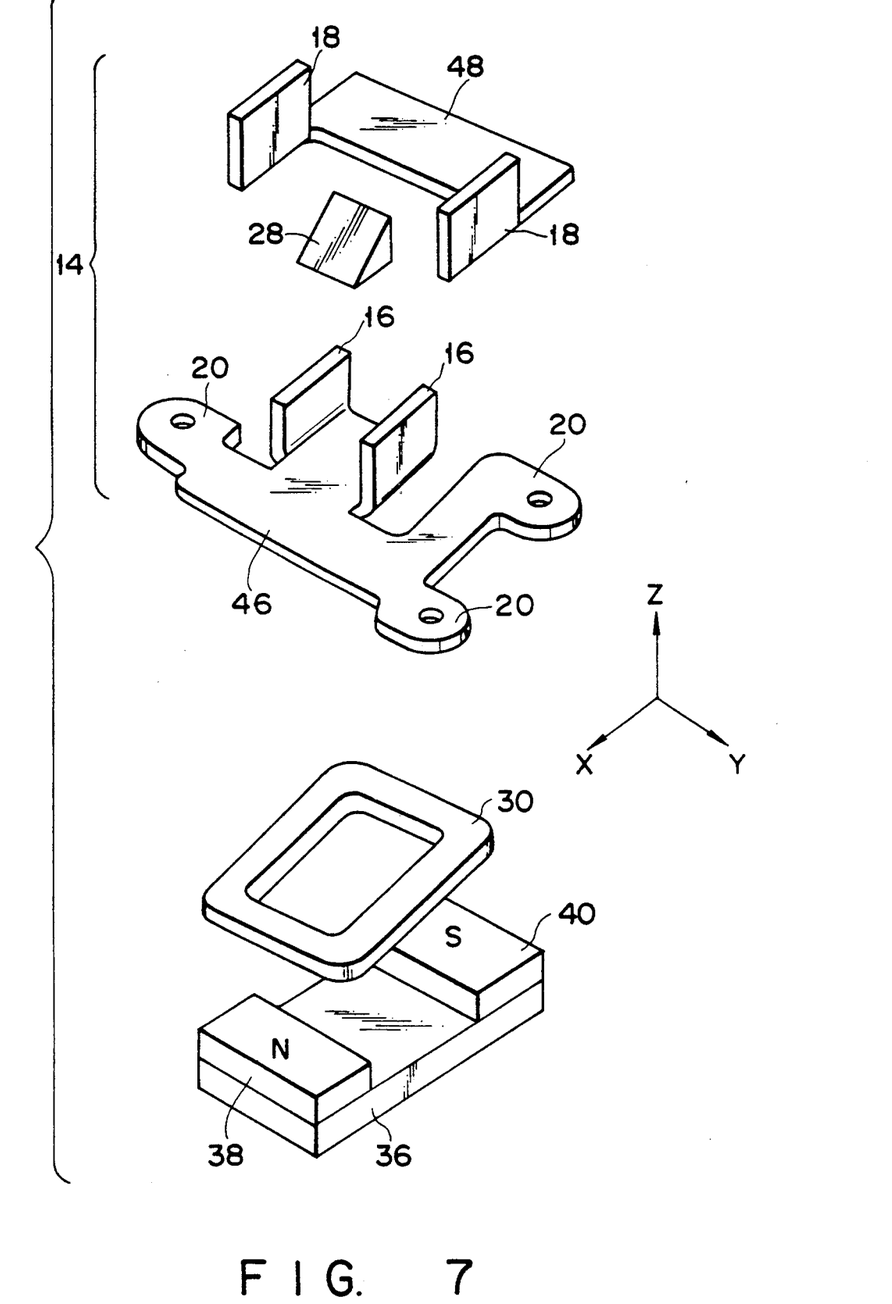
FIG. 7 is an exploded perspective view showing a carriage, a carriage coil, and magnets of an optical element drive apparatus according to a second embodiment of the present invention.
Figure 8:
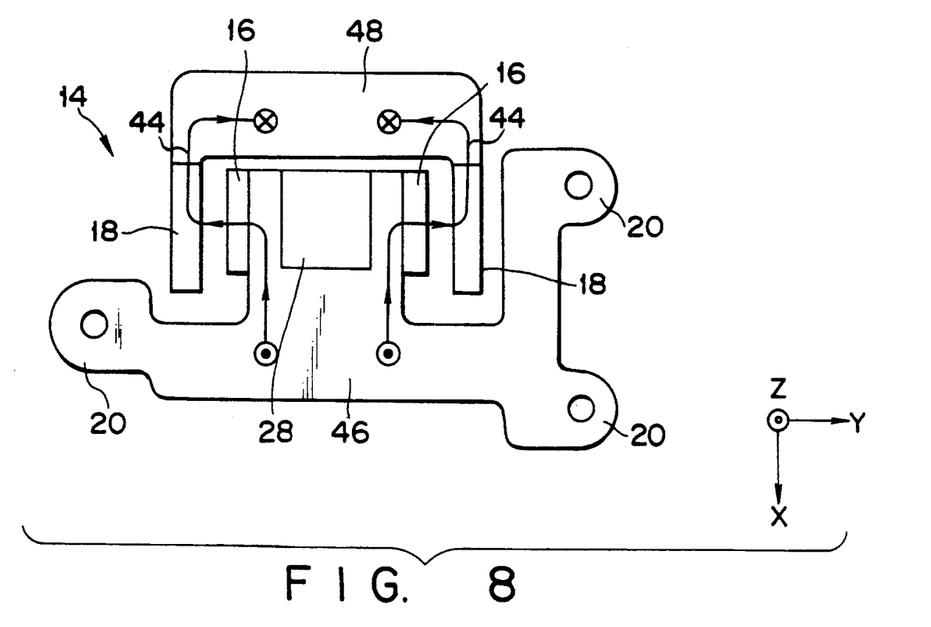
FIG. 8 is a top view of the carriage shown in FIG. 7.
Figure 9:
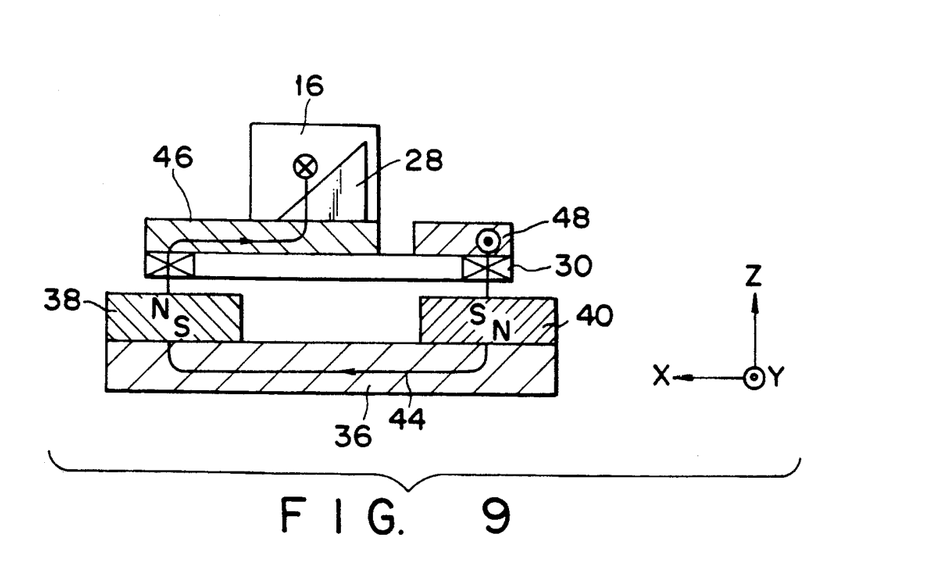

Referring now to FIGS. 7 to 9, an optical element drive apparatus according to a second embodiment of the present invention will be described. In the description to follow, like reference numerals are used to designate the same members as in the first embodiment, and only different portions or members will be explained.

In the optical element drive apparatus of the second embodiment, the carriage 14 of the first embodiment is magnetically divided in two, first and second carriages (first and second carriage parts) 46 and 48, and the first magnet 22 is omitted. The first carriage 46 has the pair of inner yokes 16, while the second carriage 48 has the pair of outer yokes 18. The carriages 46 and 48 are arranged integrally with each other by being fixed on the carriage coil 30. In the present embodiment, as shown in FIGS. 8 and 9, a magnetic flux produced by the front second magnet 38 flows through the bottom wall of the second carriage 48, the inner yoke 16, the outer yoke 18, the bottom wall of the first carriage 46, the rear second magnet 40, and the fixed yoke 36, in the order named, and then returns to the magnet 38. For the other components, the second embodiment is arranged in the same manner as the first embodiment. With this arrangement, focusing and tracking actuators for the objective lens 2 do not require use of any magnets, that is, the first magnets of the first embodiment are unnecessary. Consequently, the components used in the apparatus can be reduced in number, that is, the weight of the apparatus can be lessened.

Figure 10:
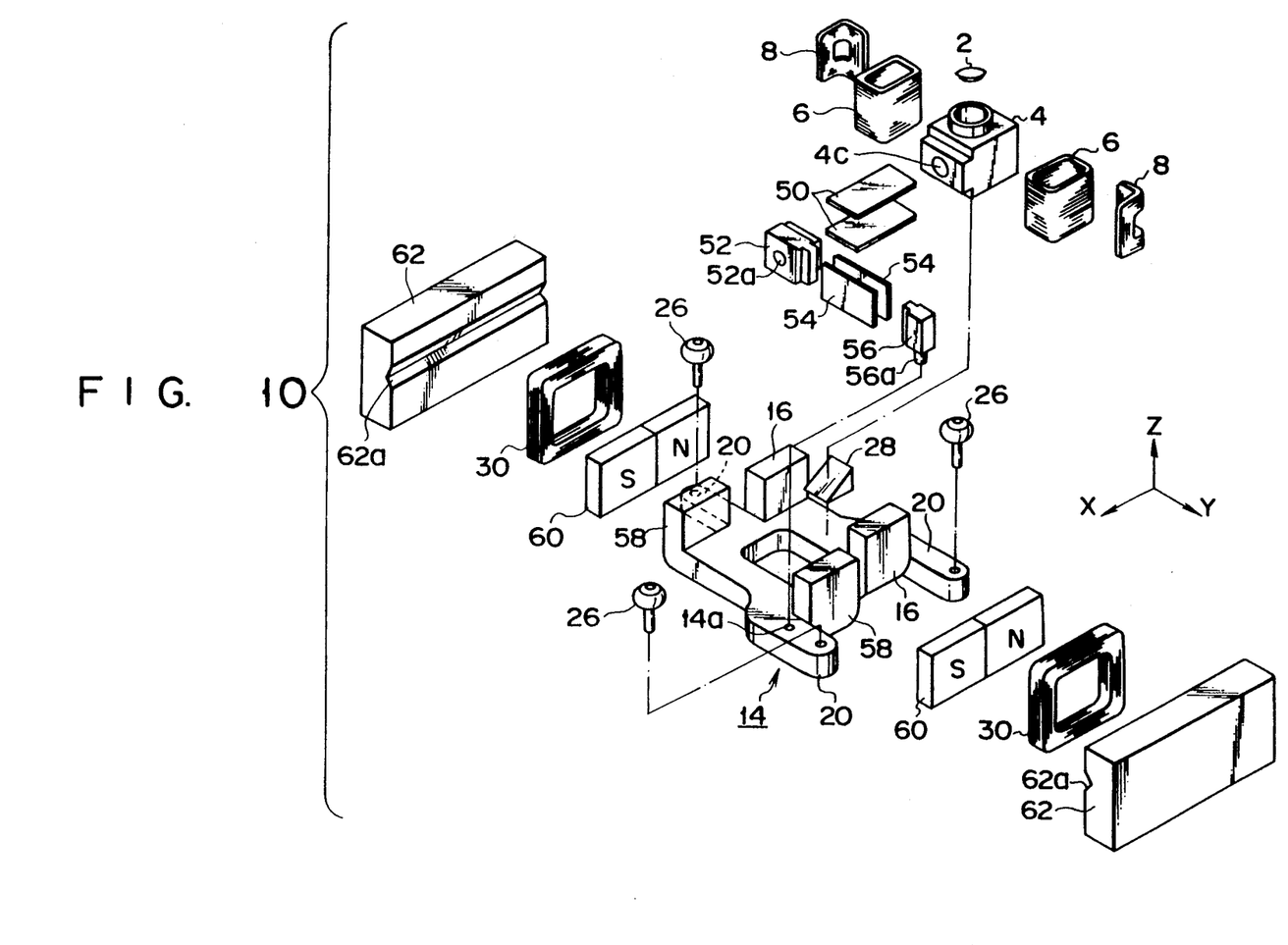
FIG. 10 is an exploded perspective view showing an optical element drive apparatus according to a third embodiment of the present invention.
Figure 11:
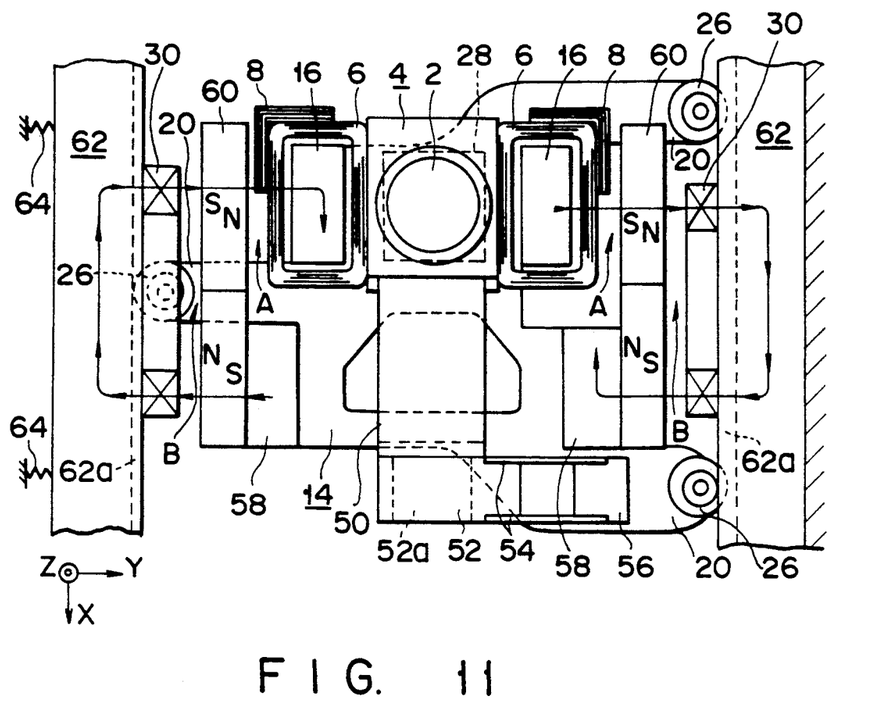
FIG. 11 is a top view of the apparatus shown in FIG. 10.
Figure 12:
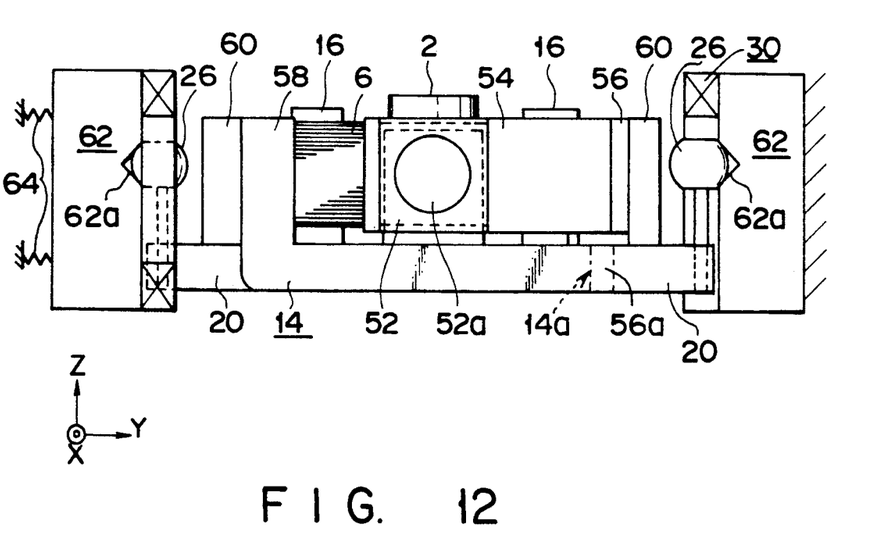
FIG. 12 is a front view of the apparatus shown in FIG. 10.

Referring now to FIGS. 10 to 12, an optical pickup according to a third embodiment of the present invention will be described. An objective lens 2 is held in the upper portion of a substantially box-shaped lens holder 4 which is open at top and bottom. The bottom opening of the holder 4 is square in shape. The whole front face of the holder 4 except the upper and lower end portions thereof projects forward. A through hole 4c is bored through the center of this projecting portion. A light beam from a stationary optical system (not shown), which is fixed in front of the optical pickup, can be introduced into the lens holder 4 through the hole 4c. A pair of focusing coils 6 are fixed individually to the opposite side faces of the holder 4. A tracking coil 8, which is bent at right angles in the center, is fixed to each focusing coil 6 so as to cover the outer side face and rear face of the coil 6. The respective proximal ends of two focusing leaf springs 50 are attached individually to the upper and lower end faces of the lens holder 4. The springs 50, which horizontally extend parallel to each other, are so thin that they can bend in the direction of the optical axis of the objective lens 2, that is, in the focusing direction. The respective distal ends of the springs 50 are attached individually to the upper and lower end faces of a junction member 52, which has, on its rear face, a projection similar to the projecting portion of the front face of the lens holder 4. The junction member 52 has a horizontally extending through hole or light transmission orifice 52a in the center. The light beam from the stationary optical system passes through the orifice 52a. A projection similar to the one on the rear face is formed on one side face of the member 52. The respective proximal ends of two tracking leaf springs 54 are attached individually to the front and rear end faces of the projection on the one side face of the junction member 52. The springs 54, which horizontally extend parallel to each other, are so thin that they can bend at right angles to the optical axis of the objective lens 2, that is, in the tracking direction. The respective distal ends of the springs 54 are attached individually to the front and rear end faces of a projection formed on one side face of a supporting member 56. A pin 56a, which protrudes from the bottom face of the member 56, is fixed on a carriage 14, which will be mentioned later. These individual members constitute a fine actuator section in conjunction with one another.

The carriage 14 is formed having a pair of fixing portions 58 and a pair of inner yokes 16. For lighter weight, an opening is bored through the central portion of the carriage 14. A mirror 28 is fixed to the upper surface of the front portion of the carriage 14. The fine actuator section is set on the carriage 14 in a manner such that the pin 56a of the supporting member 56 is fitted in a hole 14a of the carriage 14, the mirror 28 is fitted in an opening portion in the bottom face of the lens holder 4, and the focusing coil 6 on each side face of the holder 4 is loosely fitted on its corresponding inner yoke 16 of the carriage 14. Thus, the objective lens 2 is supported on the carriage 14 so as to be movable in the direction of its optical axis an in the direction perpendicular thereto, that is, in the focusing and tracking directions.

About half the area of one pole surface of each of two double-pole magnets 60 is fixed to its corresponding fixing portion 58 of the carriage 14. The remaining near half area of each magnet 60 faces its corresponding inner yoke 16 so that a magnetic gap A is defined between them. The respective distal end portions of three legs 20 project outside the magnets 60, two on the right-hand side and one on the left. A stem portion of each of three bearings 26 is press-fitted and fixed in a vertical hole formed in each corresponding distal end portion. A bearing portion of each bearing 26, which includes an outer ring having a spherical surface, is rotatably mounted on the stem portion, and is in engagement with a V-groove 62a in its corresponding outer yoke 62. The outer yokes 62 are elongated. One of the yokes 62 is fixed to a frame of an optical disk recording and retrieving apparatus (not shown), and the other is urged by means of a pair of springs 64, as shown in FIG. 11. Thus, the three bearings 26 are pressed against the V-grooves 62a of the outer yokes 62 by the springs 64, and the whole carriage 14, i.e., a coarse actuator section, is movable in the tracking direction along the V-grooves 62a. A magnetic gap B is defined between each magnet 60 and its corresponding outer yoke 62. A carriage coil 30 is fixed to the inside of each outer yoke 62 so that it is situated in each corresponding magnetic gap B. Thus, in the optical pickup of the present embodiment, the magnetic gaps A for driving the objective lens 2 and the magnetic gaps B for driving the carriage 14 are separately defined by means of the common magnets. As shown in FIG. 11, the right-hand carriage coil 30 is located between the two right-hand legs 20 of the carriage 14, while the left-hand carriage coil 30 is arranged so that the left-hand leg 20 of the carriage 14 is situated therein.

The optical pickup, constructed in this manner, forms closed magnetic circuits in the directions of the arrows shown in FIG. 11. On the right-hand side of FIG. 11, a closed magnetic circuit is formed such that a magnetic flux delivered from the upper half of the magnet 60 enters the outer yoke 62, flows downstream along the longitudinal direction of the yoke 62, and emerges from the yoke 62 to the lower half of the magnet 60. Then, after passing through the fixing portion 58, the flux goes through the bottom portion of the carriage 14, flows in the inner yoke 16, and returns to the upper half of the magnet 60. On the left-hand side of FIG. 11, a closed magnetic circuit is formed such that a magnetic flux delivered from the lower half of the magnet 60 enters the outer yoke 62, flows upstream along the longitudinal direction of the yoke 62, and emerges from the yoke 62 to the upper half of the magnet 60. Then, after passing through the inner yoke 16, the flux flows in the fixing portion 58, and returns to the lower half of the magnet 60.

The following is a description of processes for applying a light beam spot to the surface of an information recording medium, e.g., an optical disk, by using the optical pickup according to the third embodiment of the present invention.

First, a light beam emitted from the stationary optical system (not shown) is applied horizontally from the front of the optical pickup to the light transmission orifice 52a of the junction member 52. After passing through the orifice 52a, the light beam advances between the two focusing leaf springs 50, and reaches the through hole 4c of the lens holder 4. The light beam transmitted through the hole 4c is reflected upward by the specular surface of the mirror 2 in the holder 4, whereupon a beam spot is formed on the optical disk by means of the objective lens 2.

Then, a current is supplied to the carriage coils 30 in order to apply the beam spot to a desired track. Thereupon, forces are produced in the same direction, since the directions of the respective magnetic fields of the magnetic gaps B, which act on those two of the four sides of each carriage coil 30 which extend parallel to the optical axis, are opposite, as indicated by the arrows in FIG. 11. Thus, the whole carriage 14 moves in the tracking direction along the V-grooves 62 of the outer yokes 62. In order to accurately apply the beam spot to the optical disk, moreover, a current is supplied to the focusing coils 6 and the tracking coils 8 in the fine actuator section. Thereupon, these coils act on the respective magnetic fields of the magnetic gaps A, so that forces in the focusing and tracking directions are produced. As a result, the focusing leaf springs 50 and the tracking leaf springs 54 bend, thereby causing the lens holder 4 to move finely.

Figure 13:
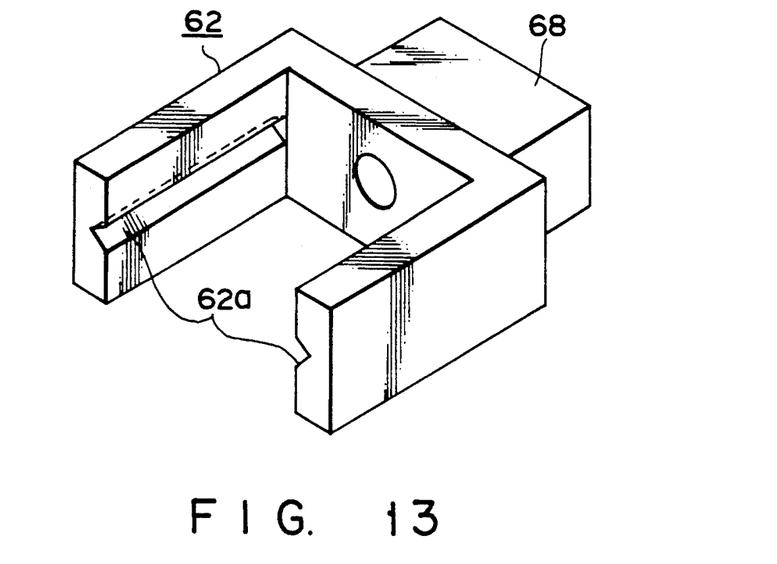
FIG. 13 is a perspective view showing a modification of an outer yoke according to the third embodiment.

In the present embodiment, one of the two outer yokes 62 is fixed to the frame of the apparatus, and the other is urged inward by means of the springs 64. Alternatively, however, these outer yokes may be replaced with a U-shaped outer yoke 62, as shown in FIG. 13. This U-shaped yoke 62 serves to provide a preload by its elastic force, thereby preventing play between the three bearings 26 and the V-grooves 62a. In this case, the two V-grooves 62a can be easily arranged with accuracy because the yoke is an integral structure. Since a stationary optical system 68 can be fixed to the outer yoke 62, moreover, the accuracy in position and angle of the system 68 and the carriage 14 can be easily attained.

Figure 14:
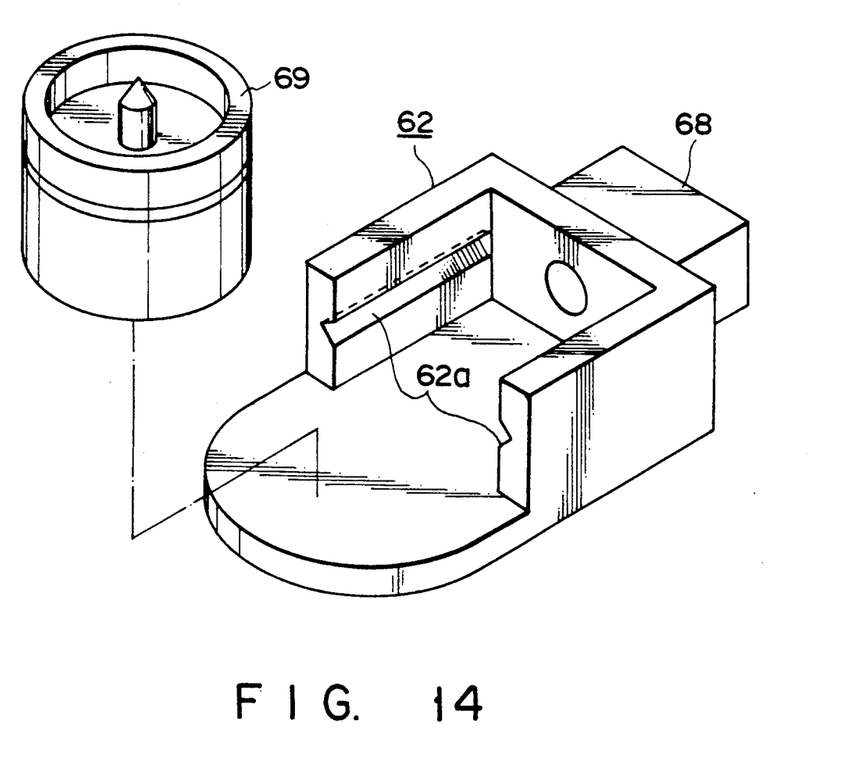
FIG. 14 is a perspective view showing another modification of the outer yoke according to the third embodiment.

Alternatively, moreover, the U-shaped outer yoke 62 may be formed with a bottom face having an extending portion, as shown in FIG. 14, so that a spindle motor 69 for rotating the disk is fixed to the extending portion. In this case, all the optical parts can be integrally attached to the outer yoke 62, so that the positional accuracy of the individual parts can be easily attained. Thus, there is no need of any frame or the like for fixing the outer yoke 62, stationary optical system 68, spindle motor 69, etc., so that the components used in the apparatus can be reduced in number, that is, the size and weight of the apparatus can be lessened.

Figure 15:
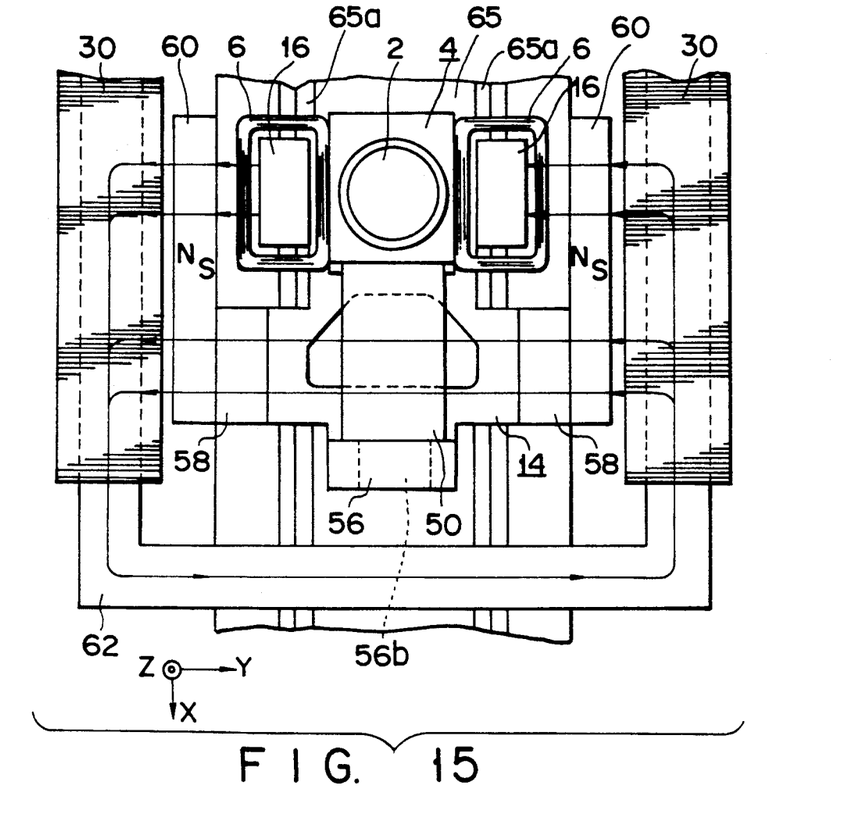
FIG. 15 is a top view showing an optical element drive apparatus according to a fourth embodiment of the present invention.
Figure 16:
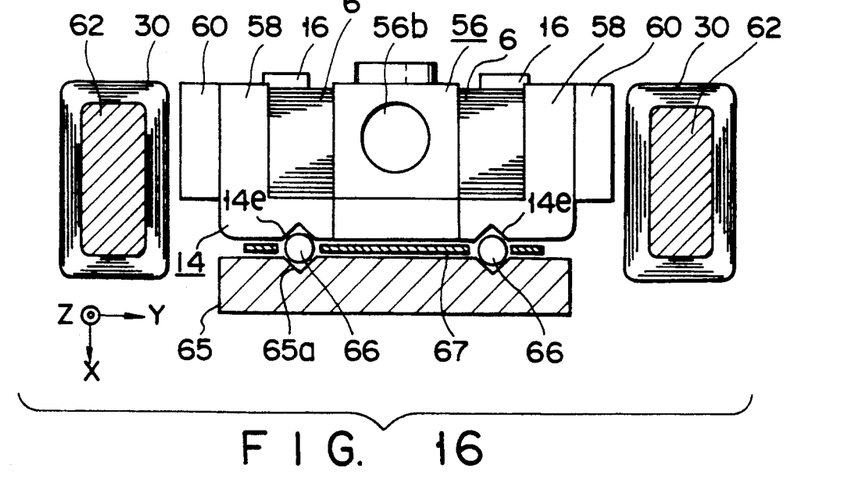
FIG. 16 is a front view of the apparatus shown in FIG. 15.

Referring now to FIGS. 15 and 16, an optical pickup according to a fourth embodiment of the present invention will be described in detail. In the description to follow, like reference numerals are used to designate members corresponding to their counterparts in the third embodiment, and those corresponding members will be mentioned in brief.

The respective proximal ends of two focusing leaf springs 50 are attached individually to the upper and lower portions of the front face of a lens holder 4 of the fourth embodiment. The respective distal ends of the springs 50 are attached individually to the upper and lower portions of the rear face of a supporting member 56. The member 56 has a light transmission orifice 52b in the center. A light beam emitted from a stationary optical system (not shown) passes through the orifice 52b. The bottom face of the supporting member 56 is fixed to the front portion of a carriage 14. About half the structure of each of two single-pole magnets 60 is fixed to its corresponding fixing portion 58 of the carriage 14, and a pair of focusing coils 6 are loosely fitted on their corresponding inner yokes 16. A U-shaped outer yoke 62 is attached to an apparatus frame (not shown) so as to hold the two magnets 60 therein. A pair of carriage coils 30, for use as second coil means, are wound individually on those portions of the yokes 62 which face the magnets 60, around horizontal axes parallel to the tracking direction. The position of each outer yoke 62 with respect to the focusing direction is lower than that of each magnet 60. A guide 65, which extends like a rail in the tracking direction, is attached to that portion of the carriage 14 situated under the apparatus frame. Two V-grooves 65a are formed on the upper surface of the guide 65, extending parallel to each other in the longitudinal direction of the guide 65. Also, grooves 14e are formed on the bottom face of the carriage 14 so as to correspond individually to the grooves 65a. A plurality of balls 66, e.g., four in number, are interposed between the V-grooves 65a of the guide 65 and the grooves 14e of the carriage 14. A retainer 67 for regulating the respective positions of the four balls 66 is sandwiched between the carriage 14 and the guide 65. Thus, the carriage 14 is movable in the tracking direction. Since the position of each outer yoke 62 with respect to the focusing direction is lower than that of each magnet 60, moreover, the carriage 14 is subjected to a downward force through the magnets 60, by a magnetic attraction between the magnets 60 and the outer yokes 62, and therefore, the balls 66 are pressed against the guide 65. Accordingly, there is no need of any pre-load spring or the like for pressing the carriage 14 against the guide 65, so that the construction is simple. Since the guide 65, balls 66, retainer 67, and carriage 14 are attached from one direction, furthermore, assembling is easy.

In the present embodiment, the carriage coils 30 serves also as tracking coils.

Figure 17:
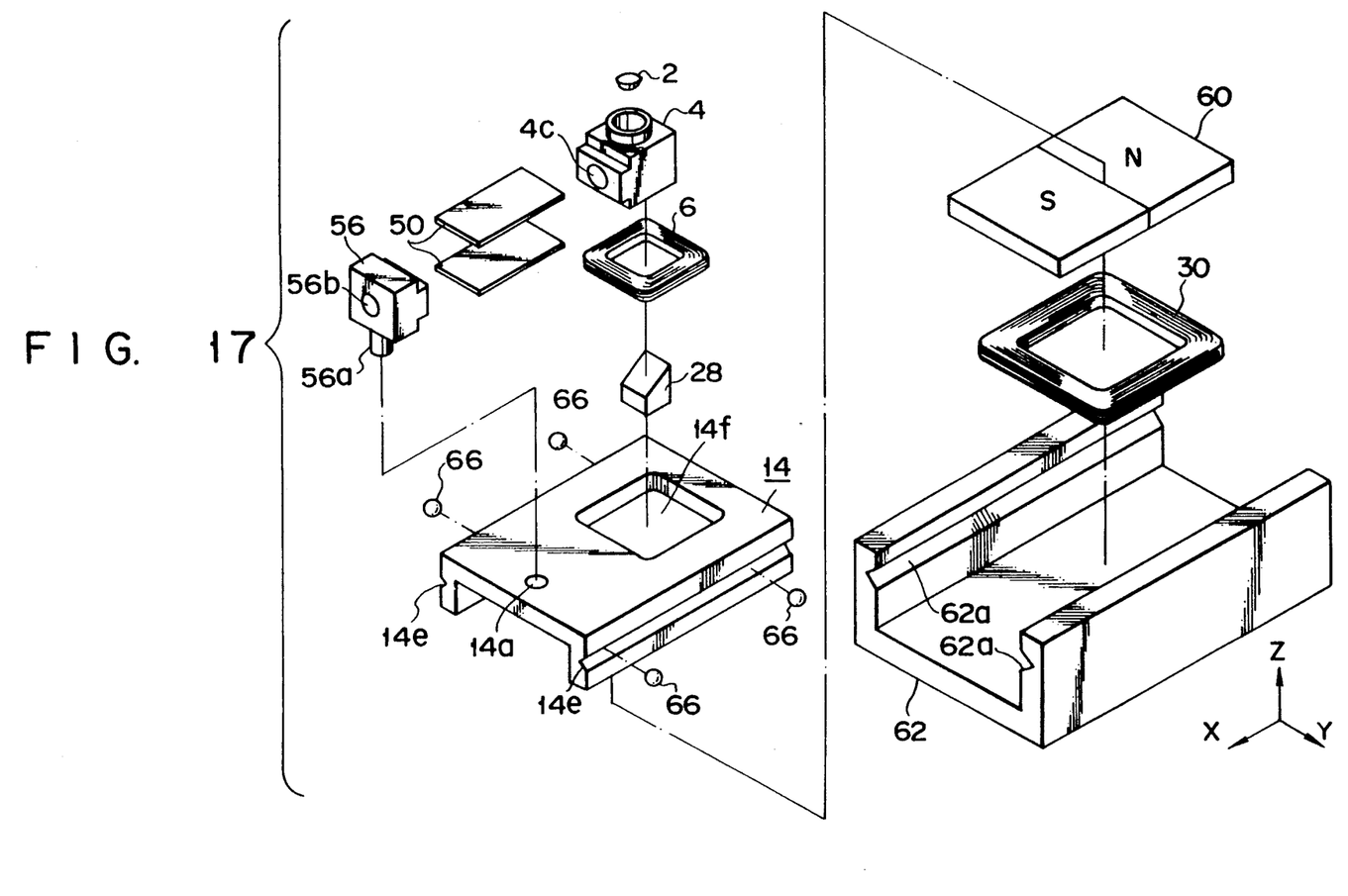
FIG. 17 is an exploded perspective view showing an optical element drive apparatus according to a fifth embodiment of the present invention.
Figure 18:
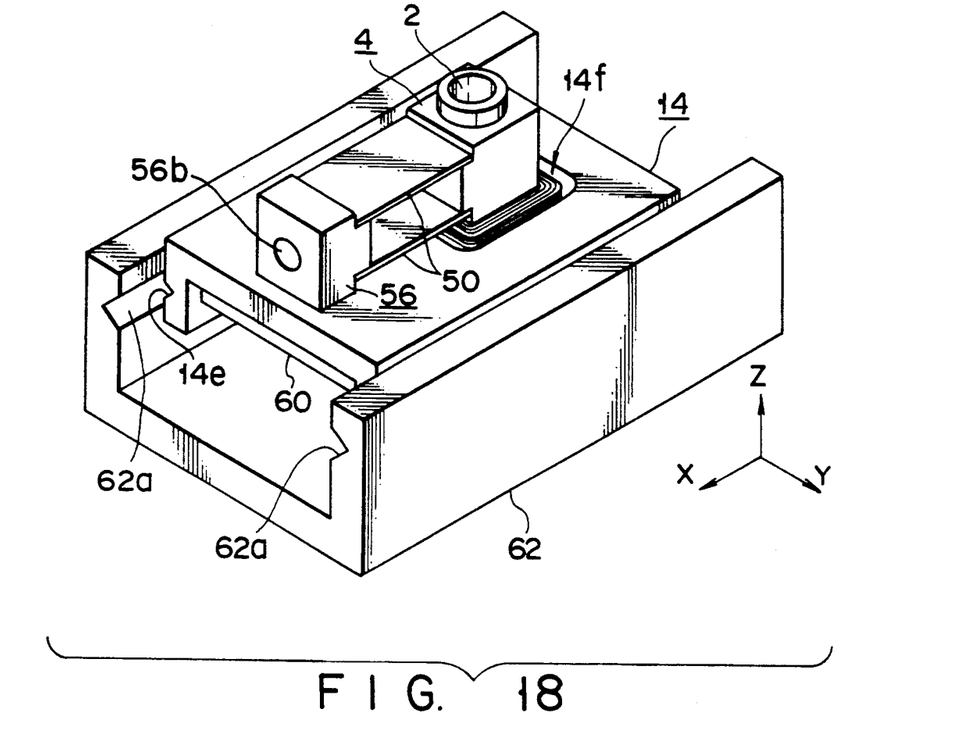
FIG. 18 is a perspective view of the apparatus shown in FIG. 17.
Figure 19:
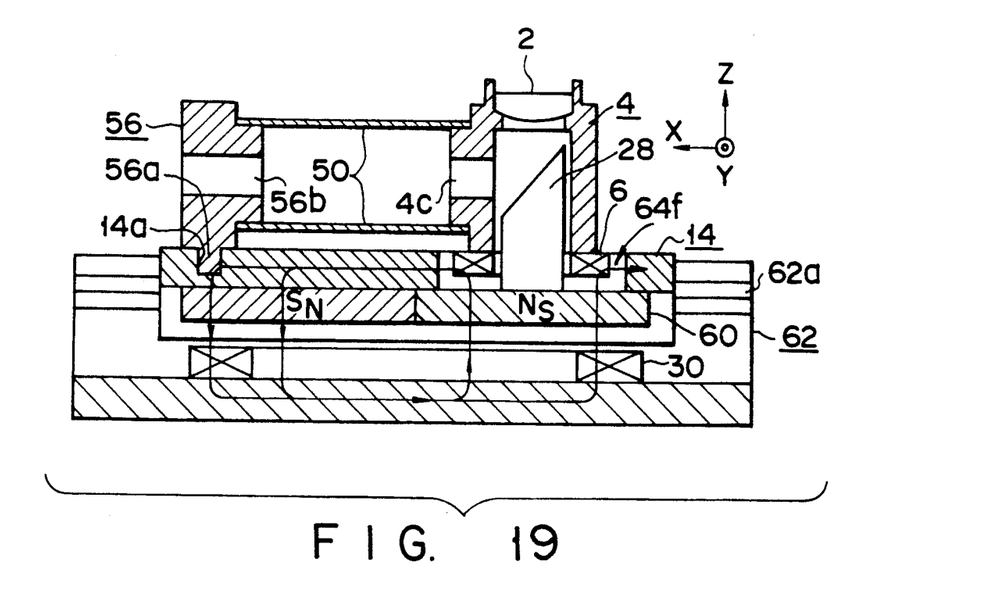
FIG. 19 is a vertical sectional view of the apparatus shown in FIG. 17.

Referring now to FIGS. 17 to 19, an optical pickup according to a fifth embodiment of the present invention will be described in detail. In the description to follow, like reference numerals are used to designate members corresponding to their counterparts in the third and fourth embodiments, and those corresponding members will be mentioned in brief.

In the optical pickup of the fifth embodiment, a focusing coil 6 is attached to the bottom face of a lens holder 4 so as to be coaxial with the optical axis of an objective lens 2. As shown in FIG. 19, the coil 6 has an inner winding side length equal to the inner side length of the lens holder 4 and an outer winding side length a little greater than the outer side length of the holder 4.

The lens holder 4 is supported on a supporting member 56 by means of a pair of focusing leaf springs 50. A pin 56a, which protrudes from the bottom face of the member 56, is fitted in a hole 14a which is formed in the front portion of the upper surface of a carriage 14. The carriage 14 is a U-shaped structure having a top wall and two opposite side walls. Horizontally extending grooves 14e are formed individually on the respective outer surfaces of the side walls of the carriage 14. The top wall of the carriage 14 has a rectangular opening portion 14f whose side length is greater enough than the outer winding side length of the focusing coil 6 to provide a play. A double-pole magnet 60 is fixed to the lower surface of the carriage 14 so that the opening portion 14f of the carriage 14 is closed thereby. A mirror 28 is fixed to the upper surface of the magnet 60 through the closed opening portion 14f. The objective lens 2 is supported on the carriage 14 for movement in the direction of the optical axis, that is, in the focusing direction (direction of arrow Y), in a manner such that the pin 56a of the supporting member 56 and the mirror 28 are fitted in the hole 14a of the carriage 14 and an opening portion in the bottom face of the lens holder 4, respectively.

An outer yoke 62, which is formed of a magnetic stainless-steel plate, is a U-shaped structure having a bottom wall and two opposite side walls. The distance between the respective inner surfaces of the side walls of the yoke 62 is a little longer than that between the respective outer surfaces of the side walls of the carriage 14. V-grooves 62a are formed individually on the respective inner surfaces of the side walls of the yoke 62 so as to correspond individually to the grooves 14e of the carriage 14. A carriage coil 30 is fixed to the upper surface of the outer yoke 62. The grooves 14e of the carriage 14, which supports the objective lens 2 for movement in the focusing direction through the medium of the various other members, are arranged corresponding to the V-grooves 62a of the outer yoke 62, individually. Four balls 66, two on each side, are interposed between these different grooves 14e and 62a. Although any number of balls may be used, four is a preferred number. Thus, the carriage 14 is movable with respect to the outer yoke 62 in the direction perpendicular to the objective lens 2, that is, in the tracking direction (direction of arrow X).

Referring now to FIG. 19, a flow of a magnetic flux in the optical pickup of the fifth embodiment, constructed in this manner, will be described.

Part of a magnetic flux delivered from the right-hand north-pole side of the magnet 6 advances to the left through the top wall portion of the carriage 14, changes its course downward at the left-hand half portion of the magnet 60, and enters the left-hand south-pole portion. After entering this south-pole portion, the magnetic flux goes down to emerge from the north-pole portion thereunder, without changing the course, and enters the left-hand end portion of the carriage coil 30. Thereafter, the flux advances to the right through the bottom wall of the outer yoke 62. When it reaches a point near the right-hand end portion of the coil 30, the magnetic flux goes out upward from the bottom wall of the yoke 62, and enters the right-hand south-pole portion of the magnet 60 after passing through the right-hand end portion of the coil 30. The other part of the magnetic flux delivered from the right-hand north-pole side of the magnet 60 passes through the focusing coil 6, which is located above, and goes to the inside end face of the opening portion 14f. As the carriage 14 and the lens holder 4 move in the tracking and focusing directions, respectively, urged by this flow of the magnetic flux, the objective lens 2 moves in the focusing and tracking directions. According to the arrangement of the present embodiment, the focusing coil 6 is situated right under the lens holder 4, so that those parts which move in the focusing direction are small-sized and light in weight. Also, every part of the focusing coil 6 can be an effective portion to produce a force in the focusing direction, so that the operating efficiency is high. Since the magnets and coils can be reduced in number, moreover, the cost of production is low, and assembling is easy.

The present invention may be carried out without being limited to the arrangements of the five embodiments described above. For example, the magnet(s) may be fixed to the bottom face of the carriage. In this case, the outer yoke(s) and the carriage coil(s) are arranged under the carriage so as to face the magnet(s).

It is to be understood, moreover, that various other changes and modifications may be effected in the present invention without departing from the scope or spirit of the invention indicated by the appended claims.

According to the optical pickup of the present invention, the optical element holding member and the whole pickup can be reduced in size and weight. By doing this, the operating sensitivity and resonance frequency can be increased, optimum magnetic gaps can be provided for the coils, and the cost of production can be lowered.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical element drive apparatus comprising:
   an optical element for applying a light beam spot to a recording surface of an information recording medium;
   a holder for holding the optical element;
   first drive means including coil means and a magnetic circuit, for driving the optical element in a focusing direction and/or a tracking direction through the holder by causing the magnetic circuit magnetically to act on the coil means;
   a carriage for supporting the optical element through the holder so that the optical element is movable in the focusing direction and/or the tracking direction, the carriage constituting at least part of the first magnetic circuit;
   supporting means for supporting the carriage to be movable in the tracking direction; and
   second drive means for driving the carriage in the tracking direction.

2. An apparatus according to claim 1, wherein said second drive means includes:
   coil means; and
   a magnet circuit partly constituted by the carriage and magnetically acting on said coil means of the second drive means to move the carriage in the tracking direction.

3. An apparatus according to claim 2, wherein said supporting means is arranged between the carriage and the second drive means.

4. An apparatus according to claim 3, wherein said second drive means includes at least one magnet constituting at least part of the magnetic circuit of the second drive means and causing the carriage to be magnetically attracted to the supporting means.

5. An apparatus according to claim 4, wherein said carriage includes first and second carriage parts magnetically isolated from each other so that the magnetic circuits of the first and second drive means commonly use said magnet.

6. An optical element drive apparatus comprising
   an optical element for applying a light beam spot to a recording surface of an information recording medium;
   a holder for holding the optical element;
   first coil means attached to the holder and driving the optical element at least in the focusing direction;
   a magnet generating a magnetic field acting on the first coil means;
   a carriage fixing the magnet thereon and supporting the holder to be movable at least in the focusing direction, the carriage being movable in the tracking direction;
   second coil means arranged to face the magnet and acted on by the magnetic field of the magnet to move the carriage in the tacking direction; and
   supporting means for supporting the carriage to be movable in the tracking direction,
   said first coil means situated closer to the optical element than the second coil means.

7. An apparatus according to claim 6, wherein said second coil means is located beside the carriage.

8. An apparatus according to claim 7, wherein said supporting means includes an outer yoke formed of a U-shaped structure having a rear wall and two side walls and supporting the carriage so that the carriage is held between the side walls.

9. An apparatus according to claim 8, wherein said second coil means is fixed to the side walls of the outer yoke.

10. An apparatus according to claim 8, wherein the rear wall of said outer yoke is fixedly fitted with a stationary optical system for emitting a light beam toward the optical element, and said outer yoke further includes a bottom wall and an extending portion extending from the bottom wall, the extending portion having thereon rotating means for rotating the information recording medium.

* * * * *